(12) United States Patent
Cheng et al.

(10) Patent No.: US 10,575,679 B1
(45) Date of Patent: Mar. 3, 2020

(54) AIR OR DEEP FRYER

(71) Applicant: Team International Group of America Inc., Miami Gardens, FL (US)

(72) Inventors: Xiao Cheng, Guangdong (CN); Uri Murad, Hollywood, FL (US); Laurent Bardot, Miramar, FL (US)

( * ) Notice: Subject to any disclaimer, the term of this patent is extended or adjusted under 35 U.S.C. 154(b) by 0 days.

(21) Appl. No.: 16/423,243

(22) Filed: May 28, 2019

(51) Int. Cl.
 *A47J 37/06* (2006.01)
 *A23L 5/10* (2016.01)

(52) U.S. Cl.
 CPC ............. *A47J 37/0641* (2013.01); *A23L 5/11* (2016.08); *A23L 5/17* (2016.08)

(58) Field of Classification Search
 CPC ............ A47J 37/0641; A23L 5/17; A23L 5/11
 USPC .................... 99/330, 339, 340, 403; 219/398
 See application file for complete search history.

(56) References Cited

U.S. PATENT DOCUMENTS

| | | | | |
|---|---|---|---|---|
| 2002/0189463 A1* | 12/2002 | Huang | ............... | A47J 37/1209 99/331 |
| 2005/0051034 A1* | 3/2005 | Cheng | ................... | A47J 27/004 99/330 |
| 2008/0237212 A1* | 10/2008 | Blackson | ................ | F24C 7/087 219/398 |
| 2013/0052310 A1* | 2/2013 | Stanford | ................. | A47J 36/32 426/231 |
| 2016/0192808 A1* | 7/2016 | Van Der Burg | ........ | A47J 37/04 99/443 C |
| 2017/0135523 A1* | 5/2017 | Millikin | .............. | A47J 37/1295 |
| 2018/0303285 A1* | 10/2018 | Cheng | ................. | A47J 37/0641 |

FOREIGN PATENT DOCUMENTS

CN 106901617 A * 6/2017 .......... A47J 37/0641

OTHER PUBLICATIONS

Chinese to English machine translation of CN 106901617, Published in Year 2017.*

* cited by examiner

*Primary Examiner* — Michael G Hoang
(74) *Attorney, Agent, or Firm* — Frank Marino

(57) ABSTRACT

An electrical appliance has a base with a housing portion and a cooking chamber portion. The housing portion includes a pre-heated air intake opening and a heated air exhaust opening with an air path in communication therebetween. The air path has an air blower and an air heater disposed there-in. The cooking chamber portion has an electrical socket and is adapted to receive, one at a time, an air-frying chamber and a deep-frying chamber. The air-frying chamber has a heated air intake opening in communication with the housing portion's heated air exhaust opening when the air-frying chamber is received by the cooking chamber portion. The deep-frying chamber has an oil heating element electrically engageable with the electrical socket when the deep-frying chamber is received by the cooking chamber portion.

2 Claims, 9 Drawing Sheets

AIR OR DEEP FRYER

FIELD OF THE INVENTION

The invention relates to apparatuses for frying foodstuffs either in hot air or by submersion in hot cooking oil, using the same appliance.

BACKGROUND

Common appliances are available for deep-frying foods in hot cooking oil and other common appliances are available for air-frying foods in turbulent hot air. But there is to date no appliance that can allow the user to select between deep-frying or air-frying.

There exists the need for an apparatus which allows for either deep-frying foods in hot cooking oil or air-frying foods in turbulent hot air within the same space, to minimize the amount of kitchen counter space occupied, and such may be an object of the invention. There exists the need for an apparatus which allows for either deep-frying foods in hot cooking oil or air-frying foods in turbulent hot air within the same space, to minimize the amount of storage space required, and such may be an object of the invention. There exists the need for an apparatus which allows for either deep-frying foods in hot cooking oil or air-frying foods in turbulent hot air within the same space, merely for convenience, and such may be an object of the invention. Further needs and objects of the invention will become apparent upon a review of the following disclosure of an exemplary embodiment.

SUMMARY OF THE INVENTION

The invention may be embodied in or practiced using an appliance having means for either deep-frying or air-frying.

The invention may be embodied in or practiced using an electrical appliance having a base with a housing portion and a cooking chamber portion. The housing portion may have a pre-heated air intake opening and a heated air exhaust opening with an air path in communication therebetween. The air path may have an air blower and an air heater disposed there-in. The cooking chamber portion may have an electrical socket and may be adapted to receive, one at a time, an air-frying chamber and a deep-frying chamber. The air-frying chamber may have a heated air intake opening in communication with the housing portion's heated air exhaust opening when the air-frying chamber is received by the cooking chamber portion. The deep-frying chamber may have an oil heating element electrically engageable with the electrical socket when the deep-frying chamber is received by the cooking chamber portion.

The electrical appliance may include a perforated basket for containing food to be air-fried or deep-fried and arranged for reception into, one at a time, the air-frying chamber and the deep-frying chamber. Activation of the air blower and the air heater when the air-frying chamber is received by the cooking chamber portion and the perforated basket is received by the air-frying chamber may cause the air-frying of food contained in the perforated basket. The air-frying of the food contained in the perforated basket may be caused by pre-heated air pulled by the air blower from the air-frying chamber though the housing's pre-heated air intake opening and the air path, where it is heated by the air heater and exhausted as heated air through the housing's heated air exhaust opening and the air-frying chamber's heated air intake opening and back into the air-frying chamber. The deep-frying chamber may be adapted to contain cooking oil. Activation of the submersible oil heating element when the deep-frying chamber is received by the cooking chamber portion and the perforated basket is received by the air-frying chamber may cause heating of cooking oil contained in the deep-frying chamber and the deep-frying of food contained in the perforated basket. The deep-frying of the food contained in the perforated basket may be caused by activation of the submersible oil heating element through electrical engagement with the electrical socket to heat the cooking oil contained in the deep-frying chamber.

The electrical appliance may also have a lid disposable atop the cooking chamber portion, and the perforated basket may have a handle which extends from the base when the perforated basket is disposed in the air-frying chamber or the deep-frying chamber and the lid is disposed on the cooking chamber portion. The perforated basket and lid may be removable from the base together by grasping the handle.

The invention may alternatively be embodied in or practiced using an appliance a base having a housing portion, a cooking chamber portion, and an oil heater. The housing portion may have a pre-heated air intake opening and a heated air exhaust opening with an air path in communication therebetween and having an air blower and an air heater disposed there-in. The cooking chamber portion may be adapted to receive, one at a time, an air-frying chamber and a deep-frying chamber. The air-frying chamber may have a heated air intake opening in communication with the housing portion's heated air exhaust opening when the air-frying chamber is received by the cooking chamber portion. The deep-frying chamber may be adapted to contain cooking oil and the oil heater may be adapted to heat the cooking oil in the deep-frying chamber when the deep-frying chamber is received by the cooking chamber portion.

The appliance may also have a perforated basket for containing food to be air-fried or deep-fried and arranged for reception into, one at a time, the air-frying chamber and the deep-frying chamber. Activation of the air blower and the air heater when the air-frying chamber is received by the cooking chamber portion and the perforated basket is received by the air-frying chamber may cause the air-frying of food contained in the perforated basket. The air-frying of the food contained in the perforated basket may be caused by pre-heated air pulled by the air blower from the air-frying chamber though the housing's pre-heated air intake opening and the air path, where it is heated by the air heater and exhausted as heated air through the housing's heated air exhaust opening and the air-frying chamber's heated air intake opening and back into the air-frying chamber. Activation of the oil heater when the deep-frying chamber is received by the cooking chamber portion and the perforated basket is received by the air-frying chamber may cause heating of cooking oil contained in the deep-frying chamber and the deep-frying of food contained in the perforated basket.

The appliance may also have a lid disposable atop the cooking chamber portion, and the perforated basket may have a handle which extends from the base when the perforated basket is disposed in the air-frying chamber or the deep-frying chamber and the lid is disposed on the cooking chamber portion. The perforated basket and lid may be removable from the base together by grasping the handle.

The invention may alternatively be embodied in or practiced using an electrical appliance with a perforated basket, a lid, and a base having a housing portion and a cooking chamber portion. The housing portion may have controls, a pre-heated air intake opening, a heated air exhaust opening, and an air path in communication between the pre-heated air intake opening and the heated air exhaust opening. The air path may have an air blower and an air heater disposed there-in. The cooking chamber portion may have a thermostat and an electrical socket and may be adapted to receive, one at a time, an air-frying chamber in thermal communication with the thermostat and a deep-frying chamber comprising a fluid heater, the deep-frying chamber in thermal communication with the thermostat and the heater in electrical communication with the electrical socket. The air-frying chamber may have a heated air intake opening in communication with the housing portion's heated air exhaust opening when the air-frying chamber is received by the cooking chamber portion. The air-frying chamber and the deep-frying chamber may both be adapted to receive the perforated basket. The perforated basket adapted to receive food to be air-fried or deep-fried. The lid may be adapted to fit atop the base and cover the cooking chamber portion and the perforated basket. Energization of the air blower and air heater when the air-frying chamber is disposed in the cooking chamber portion, food is disposed in the perforated basket, and the perforated basket is disposed in the air-frying chamber, may cause pre-heated air to be pulled by the air blower from the air-frying chamber though the housing's pre-heated air intake opening and the air path, where it is heated by the air heater and exhausted as heated air through the housing's heated air exhaust opening and the air-frying chamber's heated air intake opening and back into the air-frying chamber to air-fry the food in the perforated basket. Energization of the fluid heater when the deep-frying chamber is disposed in the cooking chamber portion, food is disposed in the perforated basket, and cooking oil and the perforated basket are disposed in the air-frying chamber, may cause heating of the oil to deep-fry the food in the perforated basket. The perforated basket may have a handle which extends from the base when the perforated basket is disposed in the air-frying chamber or the deep-frying chamber and the lid is disposed on the cooking chamber portion. The perforated basket and lid may be removable from the base together by grasping the handle.

Further features and aspects of the invention are disclosed with more specificity in the Detailed Description and Drawings provided herein and showing exemplary embodiments of the invention.

BRIEF DESCRIPTION OF THE DRAWINGS

An exemplary embodiment of an appliance for selectably deep-frying foods in heated cooking oil or air-frying foods in turbulent heated air, in accordance with or useful in practicing the invention is shown in the accompanying Drawings, of which.

DESCRIPTION OF AN EXEMPLARY EMBODIMENT

Figure 1:
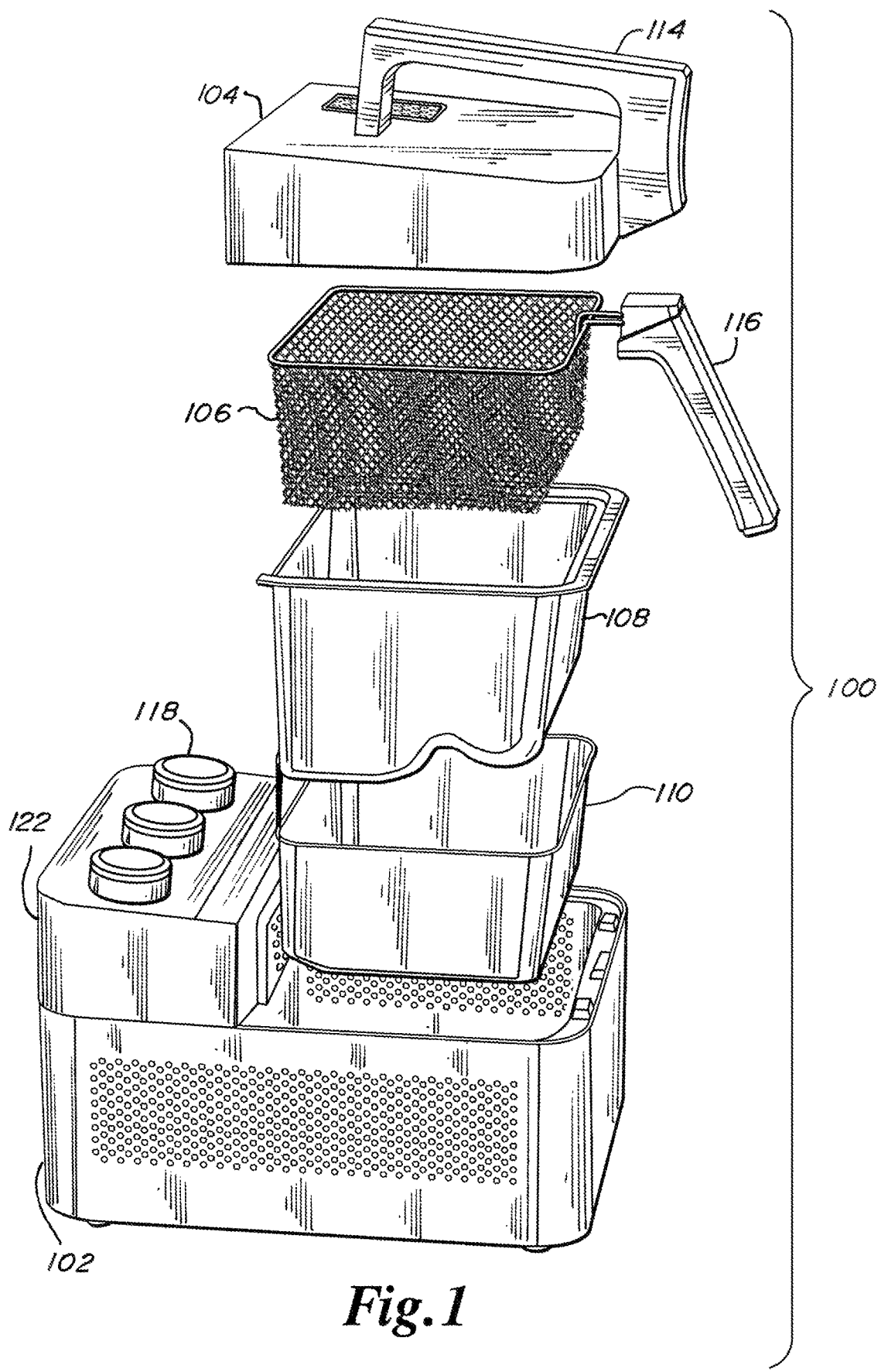
FIG. 1 is an exploded view of the appliance to show the nest-ability of the air-frying and deep-frying components during packaging.
Figure 2:
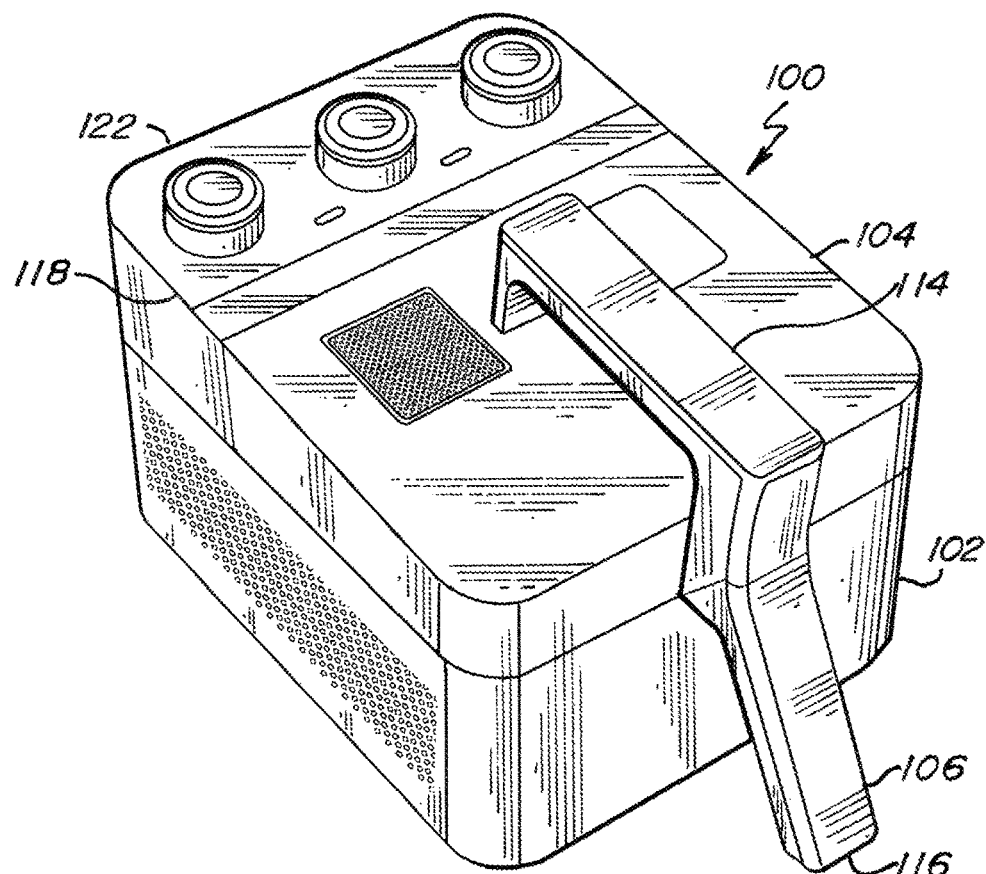
FIG. 2 is a top front perspective view of the appliance of FIG. 1.
Figure 3:
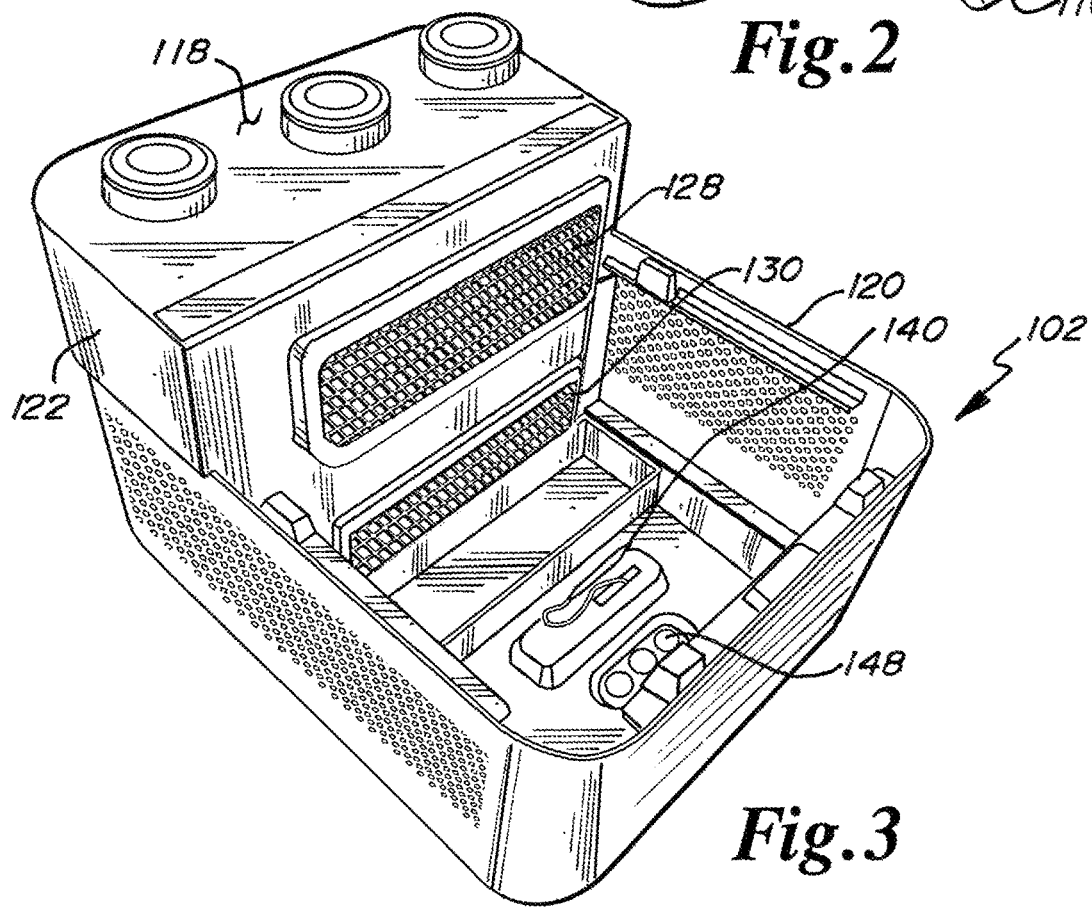
FIG. 3 is a top front perspective view of the empty base of the appliance of FIG. 1.
Figure 4:
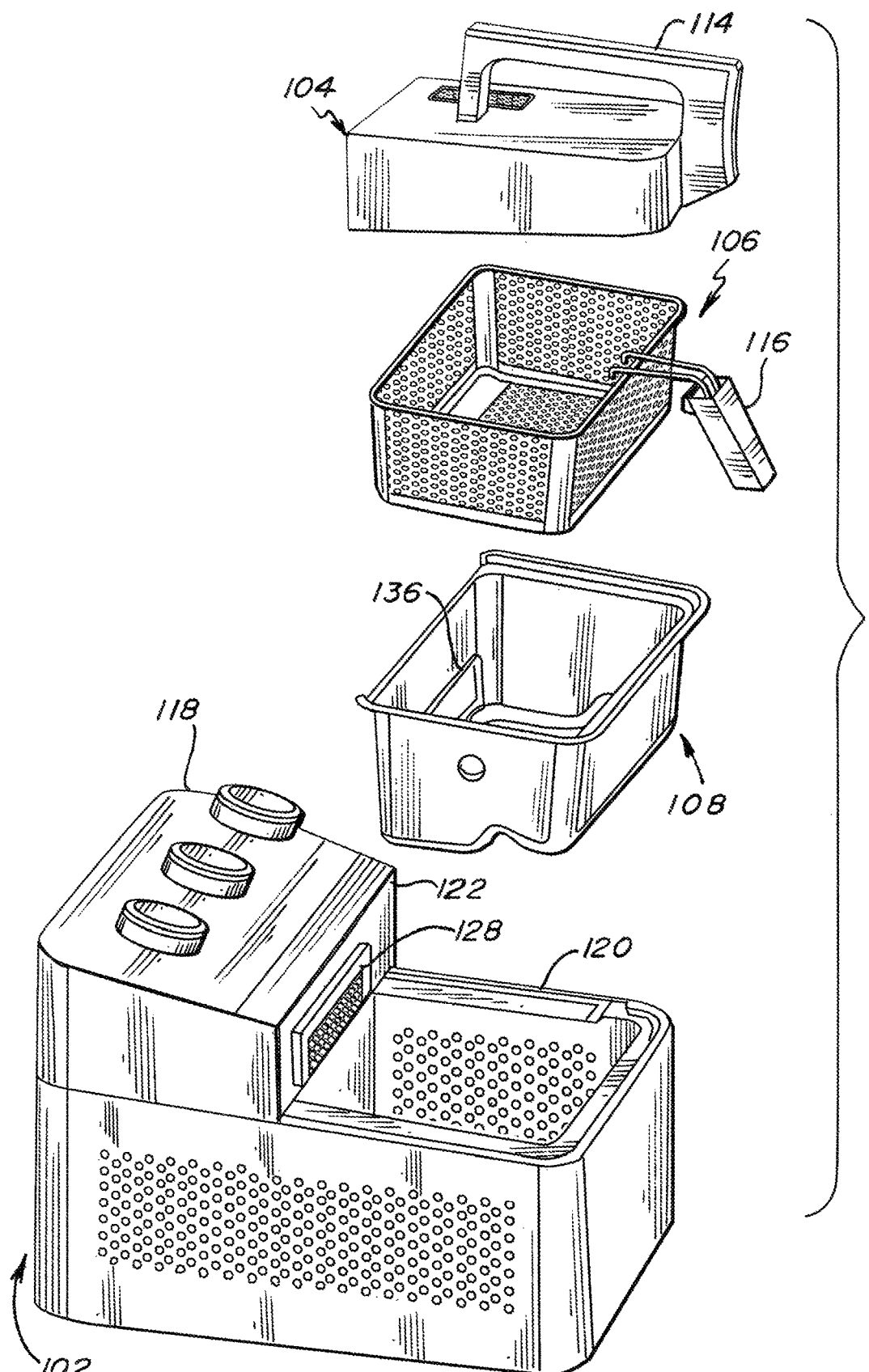
FIG. 4 is an exploded view of the air-frying components of the appliance of FIG. 1.

Referring to FIGS. 1 through 12, there is shown an exemplary appliance 100. The appliance includes a base 102, a lid 104, a perforated frying basket 106, and two alternatively useable cooking chambers; air-frying chamber 108 and deep-frying chamber 110. Fig shows all of the components as they would be unpacked from a carton to show that all of the components may be nested together to reduce volume for shipping and storage. FIG. 2 shows the base with the basket and lid. FIG. 3 shows the empty base with the lid removed. FIGS. 4-7 show the appliance with only its components needed for air-frying. FIGS. 8-12 show the appliance with only its components needed for deep-frying.

Referring to FIG. 2, it can be seen that, whether used as an air-fryer of a deep-fryer, the lid encloses the cooking chamber and is removable therefrom by lid handle 114 accessible atop the lid. The basket's handle 116 is also accessible at the front of the base so that the basket and lid may alternatively be removed together. This is to protect the user from splattering by the hot food in the basket. Control panel 118 atop the base allows the user to select desired functions and provides indications of various settings and conditions within the appliance.

Figure 5:
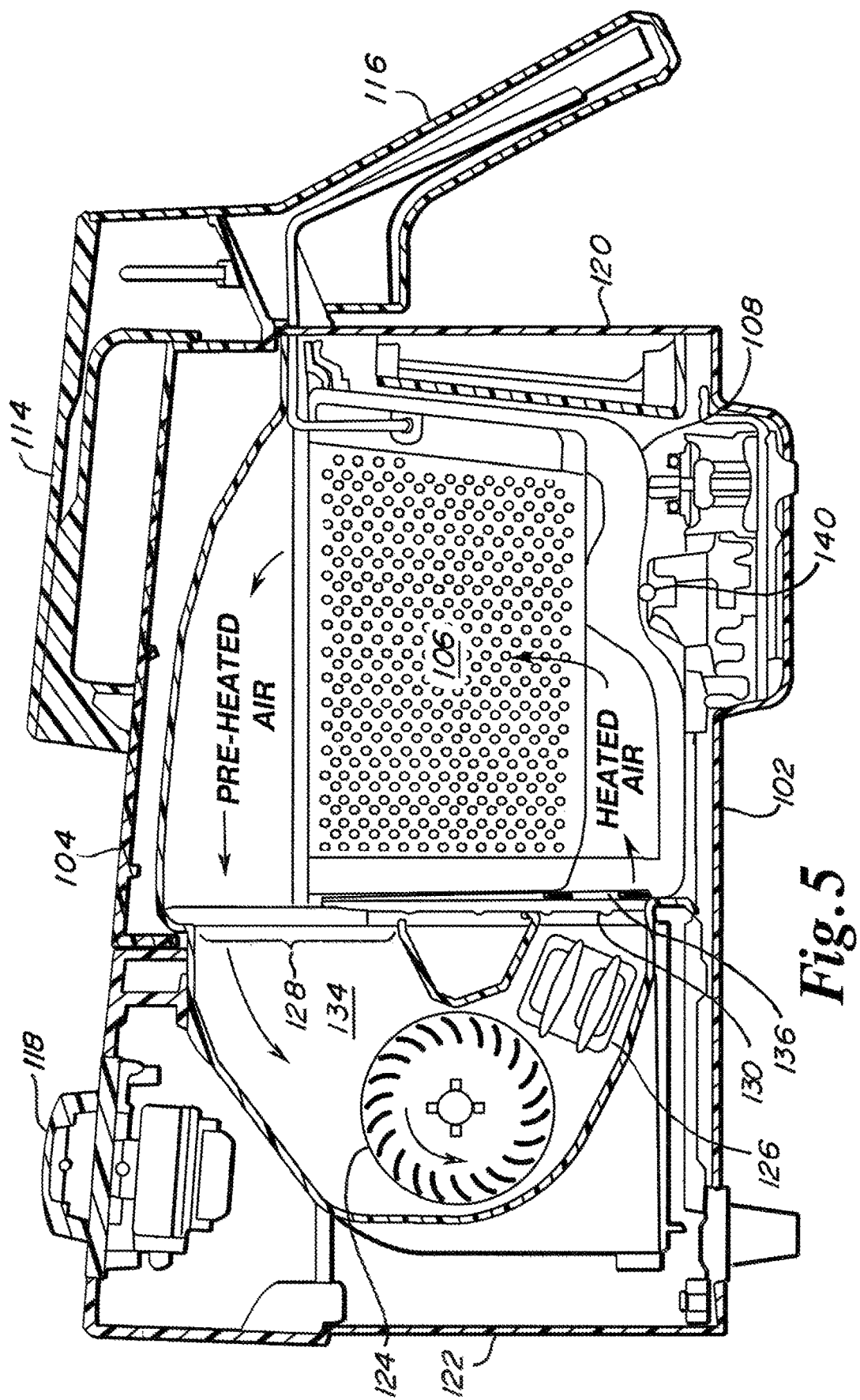
FIG. 5 is a cross-sectional side view of the appliance of FIG. 1 during air-frying.
Figure 6:
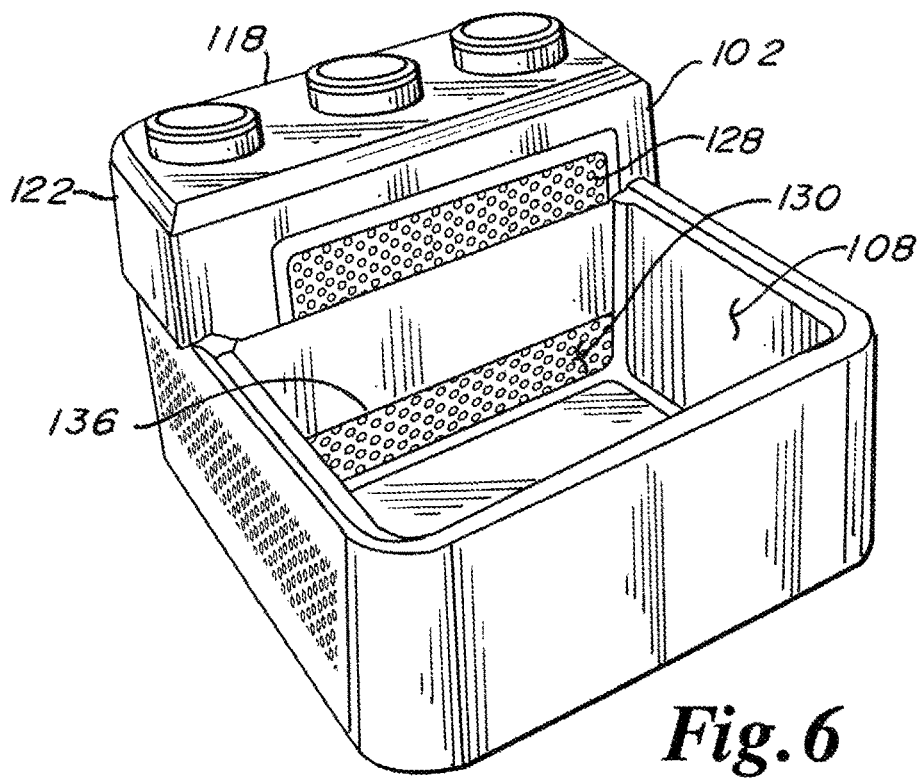
FIG. 6 is a top front perspective view of the base of the appliance of FIG. 1 with the air-frying tank installed.
Figure 7:
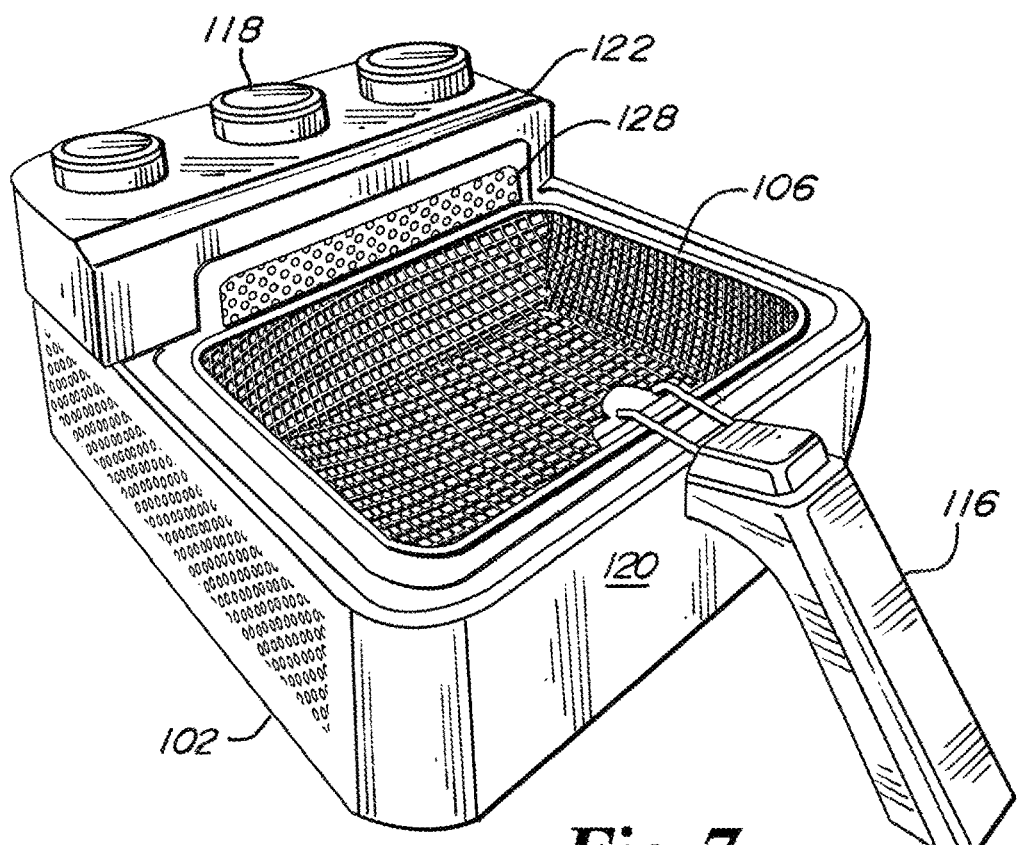
FIG. 7 is a top front perspective view of the base of the appliance of FIG. 1 with the air-frying tank and basket installed.
Figure 8:
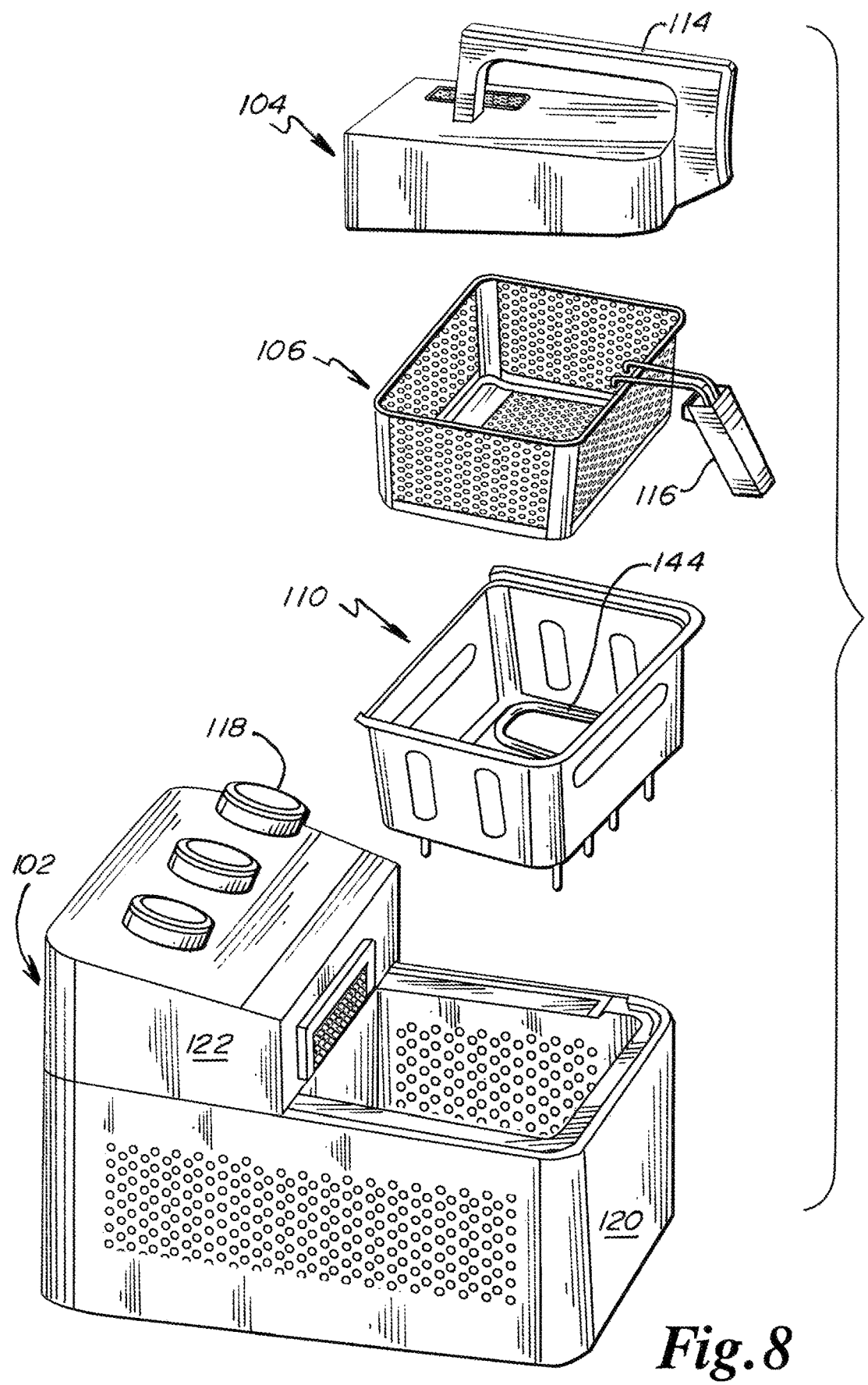
FIG. 8 is an exploded view of the deep-frying components of the appliance of FIG. 1.
Figure 9:
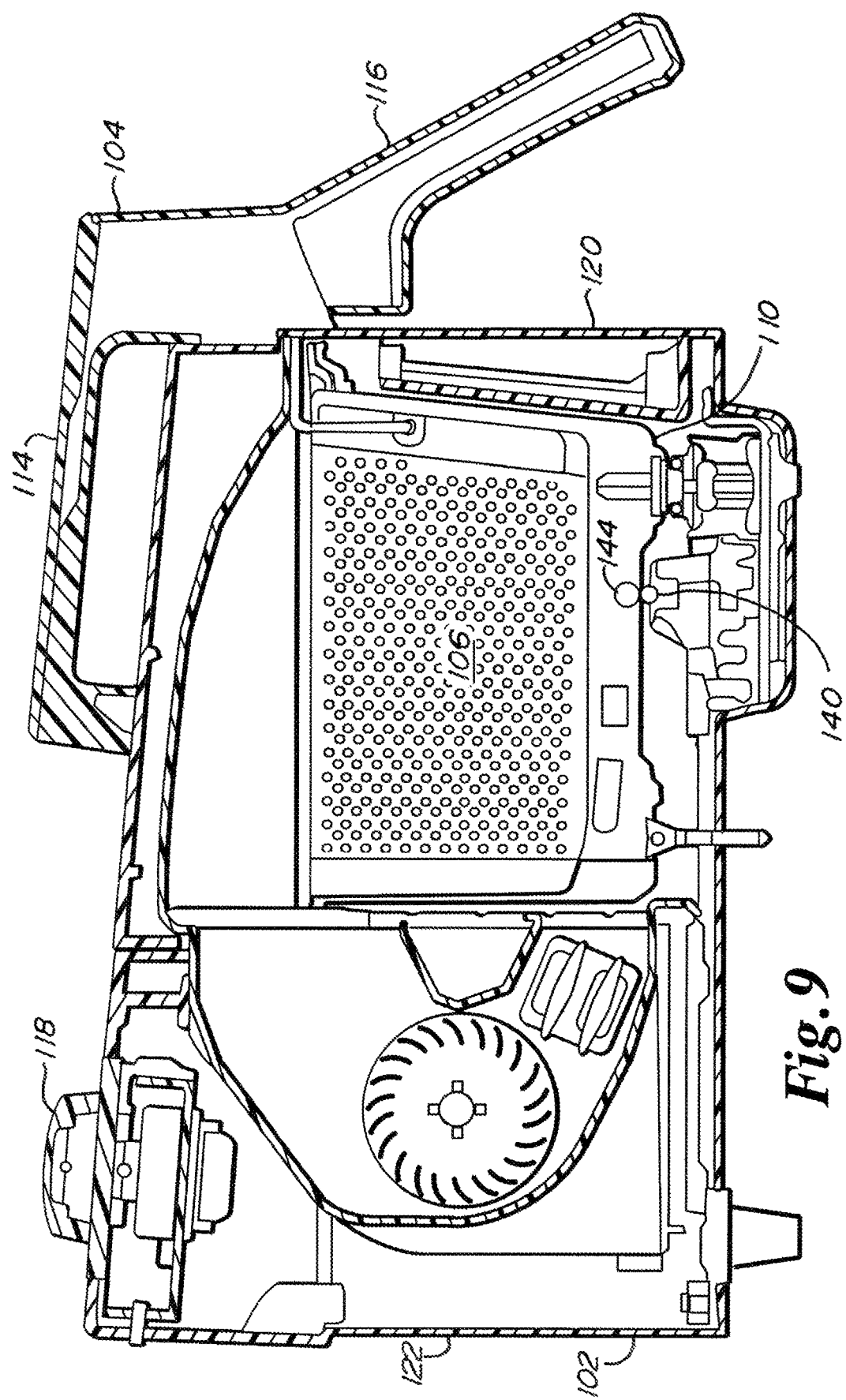
FIG. 9 is a cross-sectional side view of the appliance of FIG. 1 during deep-frying.

Referring to FIG. 3, the base includes two portions; cooking chamber portion 120 which is adapted to receive the selected cooking chamber, the basket, and the lid, and housing 122 which includes the control panel, an air blower 124, an air heater 126, a pre-heated air intake opening 128, a heated air exhaust opening 130, and an air path 134 which connects the air intake opening to the air exhaust opening and includes the air blower and air heater. The components included within the housing are best seen in FIG. 5.

Referring to FIGS. 4-7, the appliance is assembled for air-frying. The air-frying chamber is first placed into the empty base such that the air-frying chamber's heated air intake opening 136 is aligned with the housing's heated air exhaust opening, and the air-frying chamber is disposed below and there-fore not blocking the housing's pre-heated air intake opening. Next, the basket is lowered into the air-frying chamber. The basket may be pre-loaded with the food to be air-fried, or that food may be poured into the basket after the basket is installed. The lid is next placed atop the food-filled basket and fitted to the base to so that the lid, cooking chamber, an housing become a reasonably air-tight enclosure.

Next, the user selects the air-frying function and the cooking temperature and cooking time at the control panel. This initiates energization of the air blower to pull pre-heated air—from the cooking chamber through the housing's pre-heated air intake opening and the air path and initiates energization of the air heater to heat that air as it is exhausted through the housing's heated air exhaust opening and the air-frying chamber's heated air intake opening and back into the cooking chamber to air-fry the food in the perforated basket. An air-sensing thermostat disposed within the air path monitors the temperature of the air-frying chamber and activates/de-actives the air heater so that the selected cooking temperature is maintained. This continues until the selected cooking time has expired, then the air blower and air heater are de-energized and an indicator is activated at the control panel to alert the user that the food has been fully air-fried so that the user may remove the lid and basket and serve the food.

It should be noted that the base's chamber portion is separated all around the air-frying chamber and the housing is separated all around the air path by thermally-isolating air spacing to cool the outer surfaces.

Figure 10:
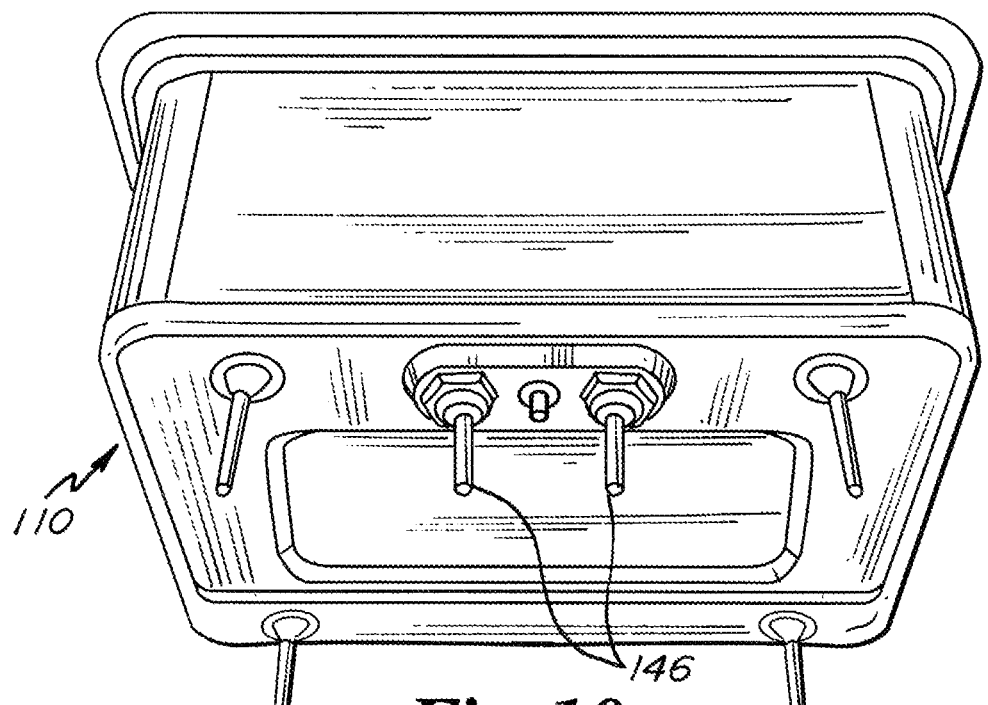
FIG. 10 is a bottom perspective view of the deep-frying tank of the appliance of FIG. 1.
Figure 11:
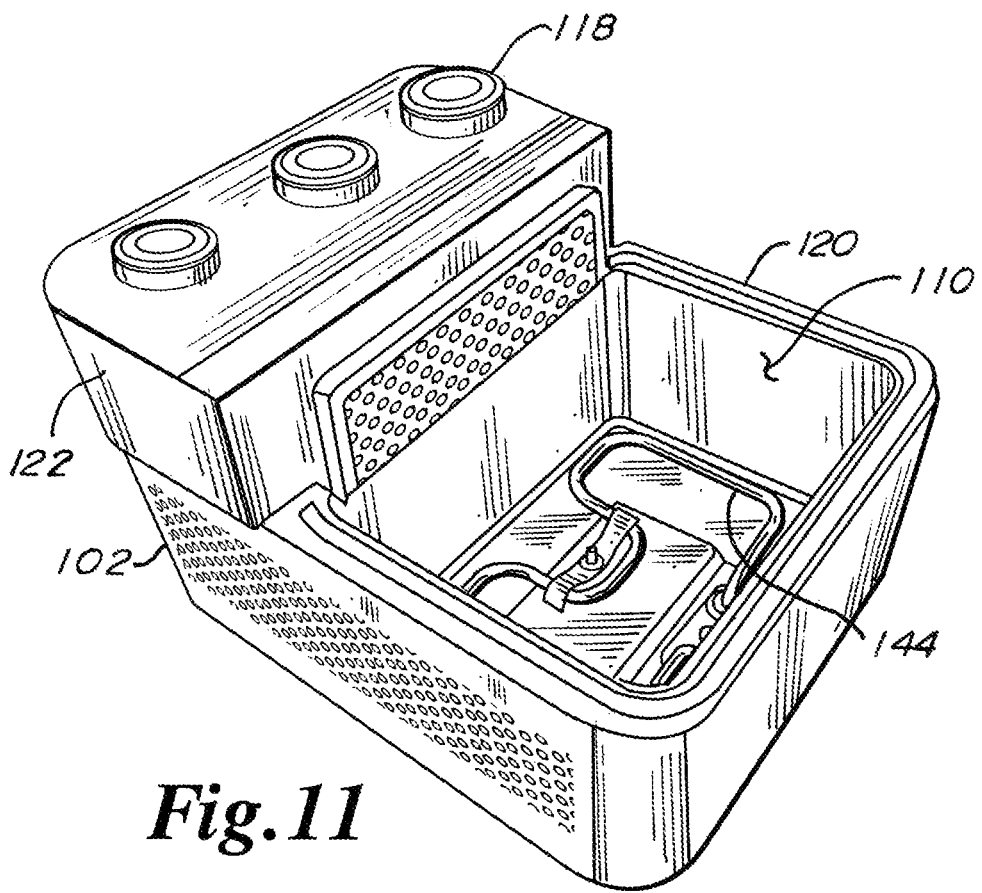
FIG. 11 is a top front perspective view of the base of the appliance of FIG. 1 with the deep-frying tank installed.
Figure 12:
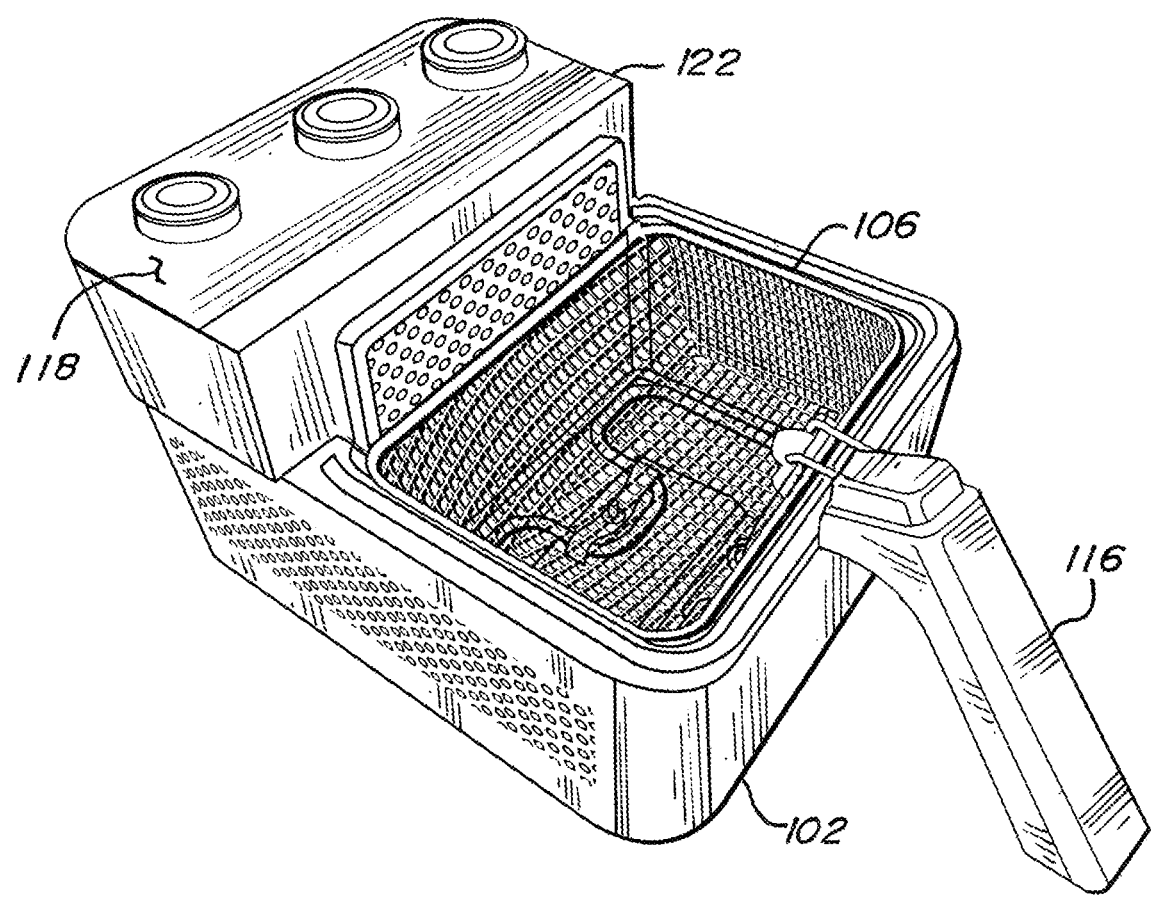
FIG. 12 is a top front perspective view of the base of the appliance of FIG. 1 with the deep-frying tank and basket installed.

Referring next to FIGS. 8-12, the appliance is assembled for deep-frying. FIGS. 10 and 11 show that the deep-frying chamber has a submersible oil heating element 144 at its inner bottom, which has two elongate terminal posts 146 protruding through and out of the bottom side. While the arrangement shown has a tubular fluid or oil heating element affixed inside a formed sheet metal chamber, the chamber could alternatively have a die cast laminated underside with a heating element embedded therein. The deep-frying chamber is first placed into the empty base such that the terminal posts 146 engage electrical socket 148 in the inner bottom of the base's cooking chamber portion. The deep-frying chamber is then filled to a marked level with cooking oil.

Next, the user selects the deep-frying function and the cooking temperature and cooking time at the control panel. This initiates energization of the submersible oil heating element to heat the oil. Once the oil has reached the selected cooking temperature, an indicator at the control panel is activated to alert the user that to lower the basket, including its food to be deep-fried, into the oil to be deep-fried. The lid is next placed atop the food-filled basket and fitted to the base. The thermostat 140 in the bottom of the cooking chamber portion of the base engages the bottom of the deep-frying chamber to monitor its temperature and activate/de-active the submersible oil heater so that the selected cooking temperature is maintained. This continues until the selected cooking time has expired, then the submersible oil heater is de-energized and an indicator at the control panel is activated to alert the user that the food has been fully deep-fried so that the user may remove the lid and basket and serve the food.

While the invention has been shown and described with reference to a specific exemplary embodiment, it should be understood by those skilled in the art that various changes in form and detail may be made without departing from the spirit and scope of the invention, and that the invention should therefore only be limited according to the following claims, including all equivalent interpretation to which they are entitled.

The invention claimed is:

1. An electrical appliance comprising a perforated basket, a lid, and a base having a housing portion and a cooking chamber portion; the housing portion comprising user accessible controls, a pre-heated air intake opening, a heated air exhaust opening, and an air path in communication between the pre-heated air intake opening and the heated air exhaust opening and having an air blower and an air heater disposed there-in;

the cooking chamber portion comprising a thermostat and an electrical socket and adapted to receive, one at a time, an air-frying chamber in thermal communication with the thermostat and a deep-frying chamber comprising a fluid heater, the deep-frying chamber in thermal communication with the thermostat and the fluid heater in electrical communication with the electrical socket; wherein the air-frying chamber comprises a heated air intake opening in communication with the housing portion's heated air exhaust opening when the air-frying chamber is received by the cooking chamber portion;

the air-frying chamber and the deep-frying chamber both adapted to receive the perforated basket;

the perforated basket adapted to receive food to be air-fried or deep-fried;

the lid adapted to fit atop the base and cover the cooking chamber portion and the perforated basket; and wherein energization of the air blower and air heater when the air-frying chamber is disposed in the cooking chamber portion, food is disposed in the perforated basket, and the perforated basket is disposed in the air-frying chamber, causes pre-heated air to be pulled by the air blower from the air-frying chamber though the housing's pre-heated air intake opening and the air path, where it is heated by the air heater and exhausted as heated air through the housing's heated air exhaust opening and the air-frying chamber's heated air intake opening and back into the air-frying chamber to air-fry the food in the perforated basket; and energization of the fluid heater when the deep-frying chamber is disposed in the cooking chamber portion, food is disposed in the perforated basket, and cooking oil and the perforated basket are disposed in the air-frying chamber, causes heating of the oil to deep-fry the food in the perforated basket, and user activation of the user accessible controls enables energization of the air heater and air blower but not the fluid heater when the air-frying chamber is received and enables energization of the fluid heater but not the air heater and air blower when the deep-frying chamber is received.

2. The electrical appliance of claim 1 wherein the perforated basket comprises a handle which extends from the base when the perforated basket is disposed in the air-frying chamber or the deep-frying chamber and the lid is disposed on the cooking chamber portion and; wherein the perforated basket and lid are removable from the base together by grasping the handle.

* * * * *